United States Patent
Hsieh

(10) Patent No.: US 11,332,210 B2
(45) Date of Patent: May 17, 2022

(54) BICYCLE HEAD

(71) Applicant: TEKTRO TECHNOLOGY CORPORATION, Changhua County (TW)

(72) Inventor: Chia-Wen Hsieh, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 329 days.

(21) Appl. No.: 16/668,110

(22) Filed: Oct. 30, 2019

(65) Prior Publication Data

US 2020/0354010 A1 Nov. 12, 2020

(30) Foreign Application Priority Data

May 8, 2019 (TW) .................................. 108115914

(51) Int. Cl.
| | |
|---|---|
| *B62K 21/12* | (2006.01) |
| *B62K 23/02* | (2006.01) |
| *B62M 25/08* | (2006.01) |
| *B62J 50/22* | (2020.01) |
| *B62K 23/06* | (2006.01) |
| *B62J 45/00* | (2020.01) |
| *B62J 50/20* | (2020.01) |
| *B62M 25/00* | (2006.01) |

(52) U.S. Cl.
CPC .............. *B62J 50/22* (2020.02); *B62K 21/12* (2013.01); *B62K 23/06* (2013.01); *B62M 25/08* (2013.01); *B62J 45/00* (2020.02); *B62J 50/20* (2020.02); *B62M 2025/003* (2013.01)

(58) Field of Classification Search
CPC ........ B62K 11/14; B62K 21/12; B62K 23/02; B62K 23/06; B62M 25/02; B62M 25/04; B62M 25/08; B62M 2025/003; B62J 45/00; B62J 50/20; B62J 50/22
See application file for complete search history.

(56) References Cited

U.S. PATENT DOCUMENTS 5,370,412 A * 12/1994 Chou ...................... B62J 50/22
                                                                  280/288.4
6,204,752 B1 * 3/2001 Kishimoto ............... B62J 50/22
                                                                  340/432
(Continued)

FOREIGN PATENT DOCUMENTS

CN          108622267 A   * 10/2018
DE          19648914 C1   *  2/1998   ................ G01P 1/16
(Continued)

*Primary Examiner* — Adam D Rogers
(74) *Attorney, Agent, or Firm* — Locke Lord LLP; Tim Tingkang Xia, Esq.

(57) ABSTRACT

The disclosure provides a bicycle head. The bicycle head includes a head assembly and a control assembly. The head assembly includes a handlebar and a stem. The handlebar is mounted on the stem. The control assembly includes a casing, a first circuit board, an antenna and a battery. The casing is pivotably disposed at a portion where the handlebar is mounted on the stem. The first circuit board, the antenna and the battery are electrically connected to one and another, and at least one of the first circuit board, the antenna and the battery is located in the casing.

14 Claims, 18 Drawing Sheets

(56) References Cited

U.S. PATENT DOCUMENTS

| | | | | |
|---|---|---|---|---|
| 6,295,888 B1* | 10/2001 | Watarai | ................... | B62M 25/04 |
| | | | | 340/432 |
| 7,448,297 B2* | 11/2008 | Tiong | ...................... | B62J 99/00 |
| | | | | 74/551.8 |
| 7,522,033 B2* | 4/2009 | Takamoto | .............. | B62M 25/08 |
| | | | | 340/425.5 |
| 7,760,078 B2* | 7/2010 | Miki | ...................... | B62M 25/08 |
| | | | | 340/432 |
| 7,779,724 B2* | 8/2010 | Fujii | ...................... | B62M 25/08 |
| | | | | 74/551.8 |
| 7,902,967 B2* | 3/2011 | Takebayashi | .......... | B62M 25/08 |
| | | | | 340/432 |
| 8,643,722 B2* | 2/2014 | Solida | ...................... | B62J 43/28 |
| | | | | 348/148 |
| 8,651,350 B2* | 2/2014 | Onogi | ...................... | B62J 99/00 |
| | | | | 224/421 |
| 9,211,936 B2* | 12/2015 | Gao | .......................... | B62L 3/02 |
| 9,302,739 B2* | 4/2016 | Shirai | .................... | B62M 25/08 |
| 9,616,964 B2* | 4/2017 | Kasai | ....................... | B62L 3/02 |
| 10,189,535 B1* | 1/2019 | Arnott | ................... | B62K 25/283 |
| 10,189,538 B2* | 1/2019 | Nishino | ................. | B62K 23/06 |
| 10,377,440 B2* | 8/2019 | Eguchi | ..................... | B62J 6/02 |
| 10,532,788 B2* | 1/2020 | Hara | .......................... | B62J 1/08 |
| 10,647,381 B2* | 5/2020 | Durdevic | ................. | B62J 11/00 |
| 10,812,645 B2* | 10/2020 | Montez | ................ | H04B 1/3877 |
| 10,960,955 B2* | 3/2021 | Howell-McLean | .... | G08C 17/02 |
| 10,988,209 B1* | 4/2021 | Luman | .................... | B62L 3/023 |
| 11,029,734 B2* | 6/2021 | Hawkins, III | ........... | B62J 50/22 |
| 2013/0311131 A1* | 11/2013 | Tanaka | ................... | B62M 25/04 |
| | | | | 702/150 |
| 2014/0252746 A1* | 9/2014 | Talavasek | ............... | B62K 25/08 |
| | | | | 280/288.4 |
| 2016/0272263 A1* | 9/2016 | Zeindl | .................... | G06F 1/1637 |
| 2019/0315436 A1* | 10/2019 | Wu | ........................ | B62K 21/12 |

FOREIGN PATENT DOCUMENTS

| | | | | |
|---|---|---|---|---|
| DE | 202007019659 U1 * | 4/2015 | ............ | B62J 50/225 |
| DE | 102016009839 A1 * | 2/2017 | ............. | B62J 50/22 |
| DE | 102020110823 A1 * | 11/2020 | ........... | B62J 50/225 |
| KR | 202106556 A * | 2/2021 | | |

* cited by examiner

BICYCLE HEAD

CROSS-REFERENCE TO RELATED APPLICATIONS

This non-provisional application claims priority under 35 U.S.C. § 119(a) on Patent Application No(s). 108115914 filed in Taiwan, R.O.C. on May 8, 2019, the entire contents of which are hereby incorporated by reference.

TECHNICAL FIELD

The disclosure relates to a bicycle head.

BACKGROUND

In recent years, riding bicycle becomes one of the popular sport, causing the bicycle market flourished. In order to provide costumers a better riding experience and a more stylish appearance of bicycle, the bicycle manufacturers pay more attention on developing new and market-oriented products.

For example, in a bicycle, a mechanical derailleur has been replaced with an electronic derailleur, and the electronic derailleur is driven by an electronic signal transmitted via a wireless manner, thus it is understood that the bicycle is required to equip with a circuit board, a signal transmission device, a battery and so on.

SUMMARY OF THE INVENTION

One embodiment of the disclosure provides a bicycle head. The bicycle head includes a head assembly and a control assembly. The head assembly includes a handlebar and a stem. The handlebar is mounted on the stem. The control assembly includes a casing, a first circuit board, an antenna and a battery. The casing is pivotably disposed at a portion where the handlebar is mounted on the stem. The first circuit board, the antenna and the battery are electrically connected to one and another, and at least one of the first circuit board, the antenna and the battery is located in the casing.

Another embodiment of the disclosure provides a bicycle head. The bicycle head includes a head assembly, a control assembly, a brake assembly and a switch assembly. The head assembly includes a handlebar and a stem. The handlebar is mounted on the stem. The control assembly includes a casing, a first circuit board, an antenna and a battery. The casing is disposed at a portion where the handlebar is mounted on the stem. The first circuit board, the antenna and the battery are electrically connected to one and another, and at least one of the first circuit board, the antenna and the battery are located in the casing. The brake assembly includes a main body, a lever clamp and a lever part. The lever clamp is connected to the main body and clamps the handlebar, and the lever part is pivotably disposed on the main body. The switch assembly includes a shift switch. The shift switch is disposed on the casing of the control assembly, the handlebar, the lever part or the lever clamp, and the shift switch is electrically connected to the first circuit board.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
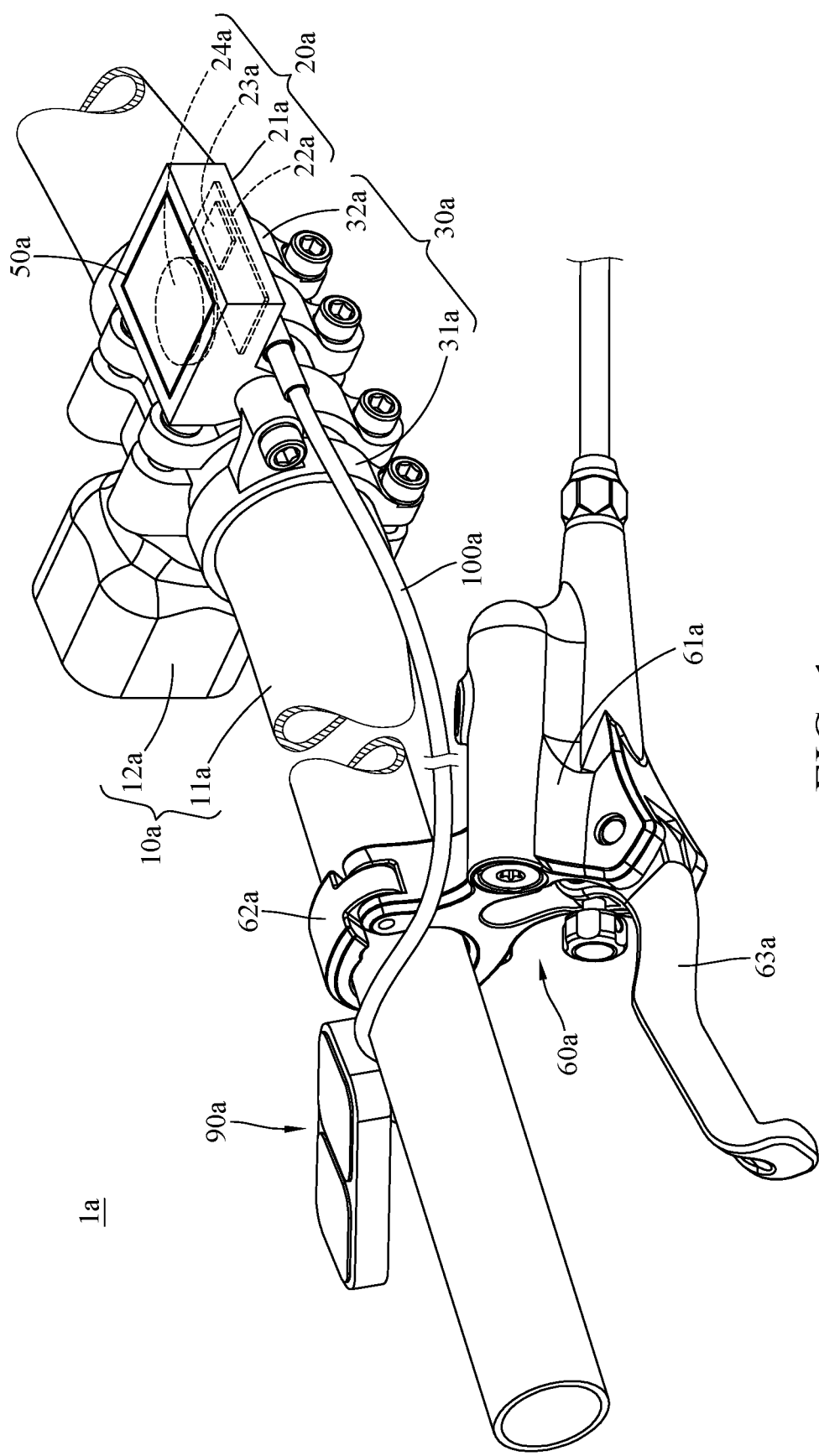
FIG. 1 is a perspective view of a bicycle head according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
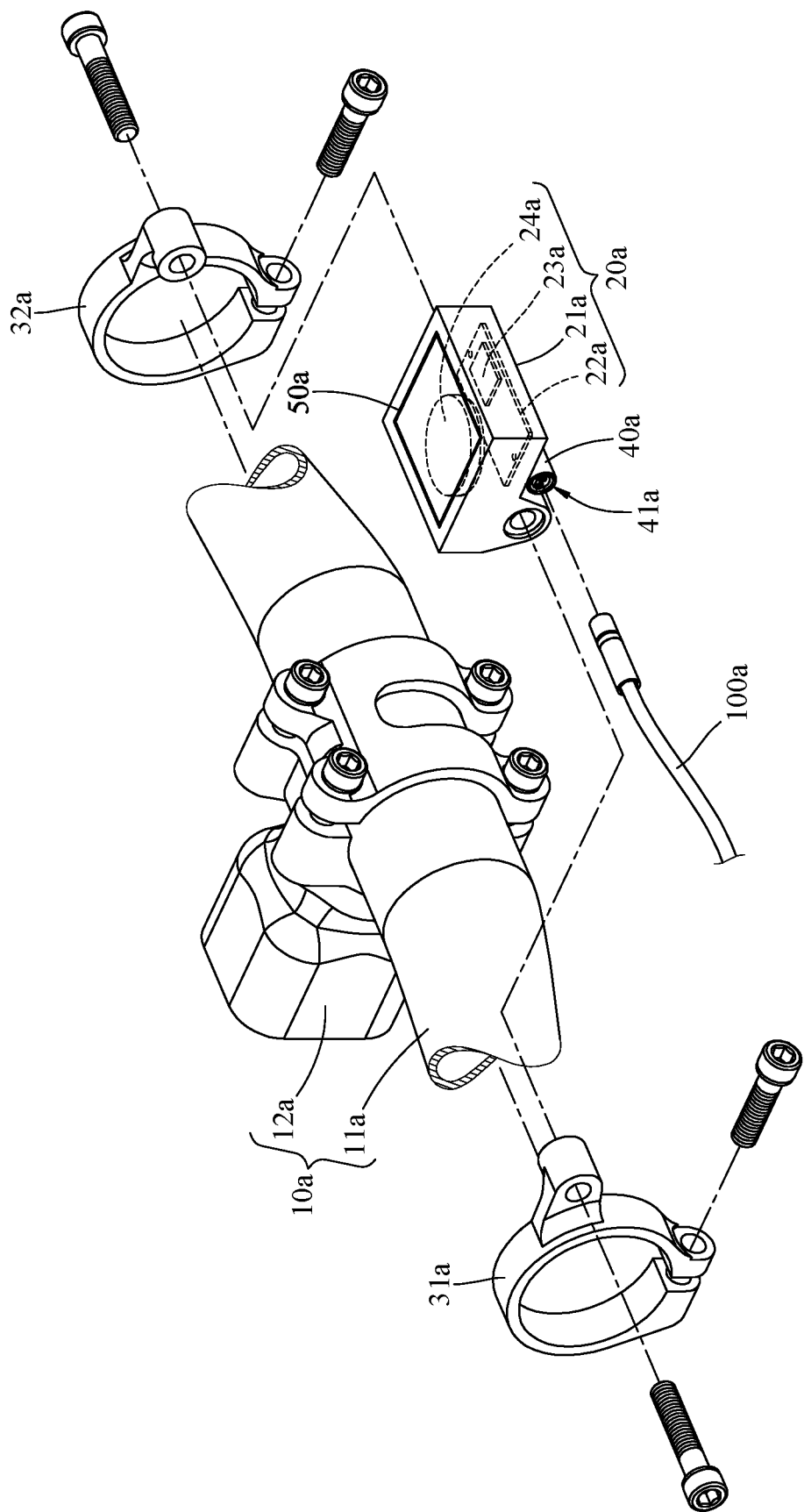
FIG. 2 is a partial exploded view of a head assembly and a control assembly of the bicycle head in FIG. 1.
Figure 3:
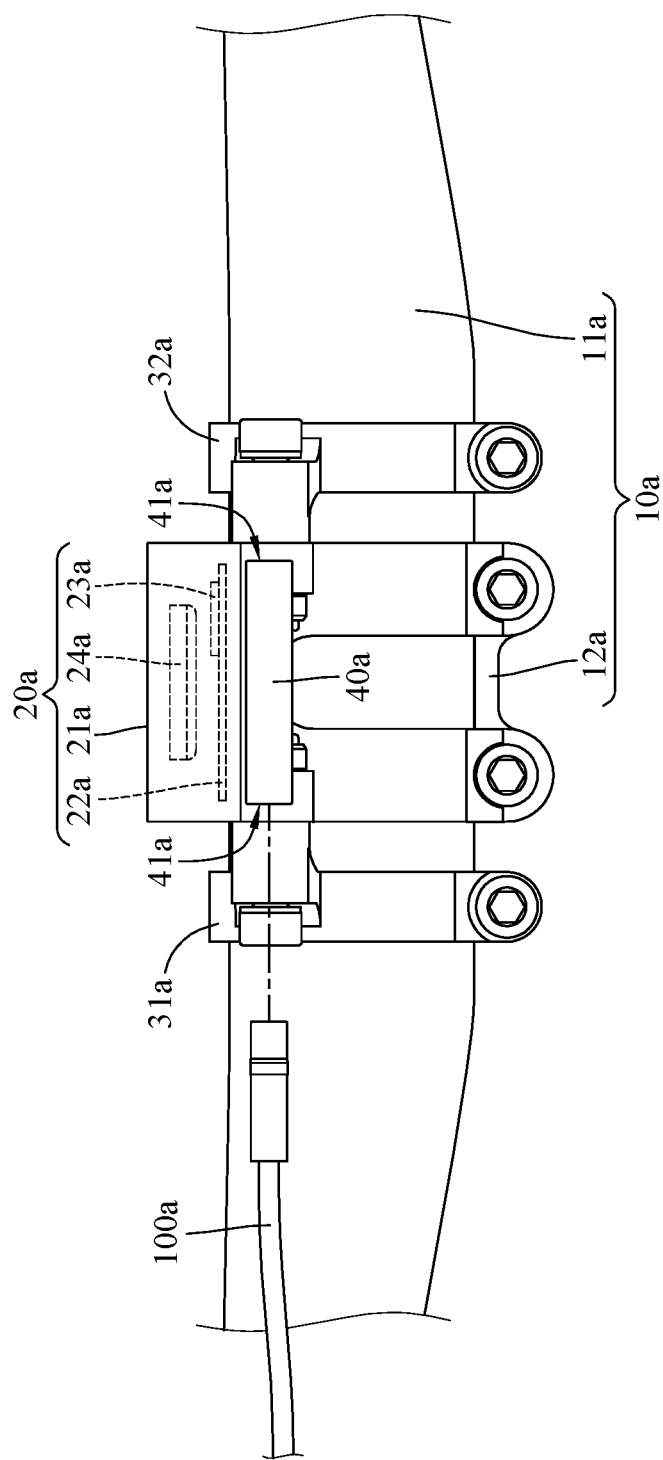
FIG. 3 is a front view of the head assembly and the control assembly of the bicycle head in FIG. 1.

Referring to FIGS. 1 to 3, where FIG. 1 is a perspective view of a bicycle head 1a according to a first embodiment of the disclosure, FIG. 2 is a partial exploded view of a head assembly 10a and a control assembly 20a of the bicycle head 1a in FIG. 1, and FIG. 3 is a front view of the head assembly 10a and the control assembly 20a of the bicycle head 1a in FIG. 1.

In this embodiment, the bicycle head 1a includes a head assembly 10a and a control assembly 20a, and the bicycle head 1a may further include a clamp assembly 30a and an electrical connector 40a.

The head assembly 10a includes a handlebar 11a and a stem 12a. The handlebar 11a is mounted on the stem 12a.

The clamp assembly 30a includes a first clamp 31a and a second clamp 32a. The first clamp 31a and the second clamp 32a are able to clamp the handlebar 11a. The first clamp 31a and the second clamp 32a are located at a portion where the handlebar 11a is mounted on the stem 12a. In addition, the stem 12a is partially located between the first clamp 31a and the second clamp 32a.

The control assembly 20a includes a casing 21a, a first circuit board 22a, an antenna 23a, and a battery 24a. The casing 21a is pivotably disposed on and located between the first clamp 31a and the second clamp 32a. The first circuit board 22a, the antenna 23a and the battery 24a are electrically connected to one and another and are all located in the casing 21a of the control assembly 20a. The electrical connector 40a is fixed on the casing 21a of the control assembly 20a and located outside the casing 21a of the control assembly 20a. The electrical connector 40a has two terminals 41a opposite to each other, and the two terminals 41a are electrically connected to the first circuit board 22a.

In this embodiment, the bicycle head 1a may further include a display 50a. The display 50a is dispose on the casing 21a. The display 50a can show the information which needed for the bicycle riding, such as speed and/or mileage.

Figure 4:
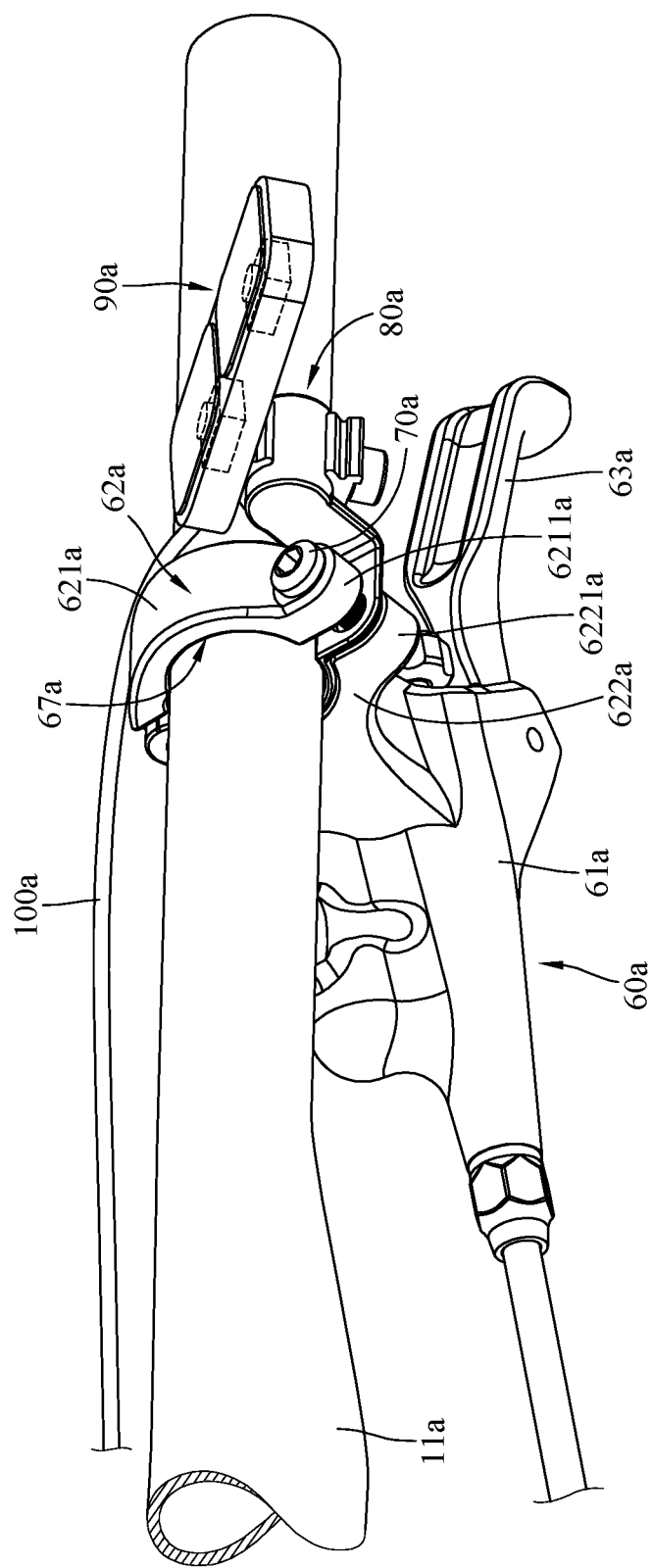
FIG. 4 is a perspective view of a handlebar, a brake assembly and a switch assembly of the bicycle head in FIG. 1.
Figure 5:
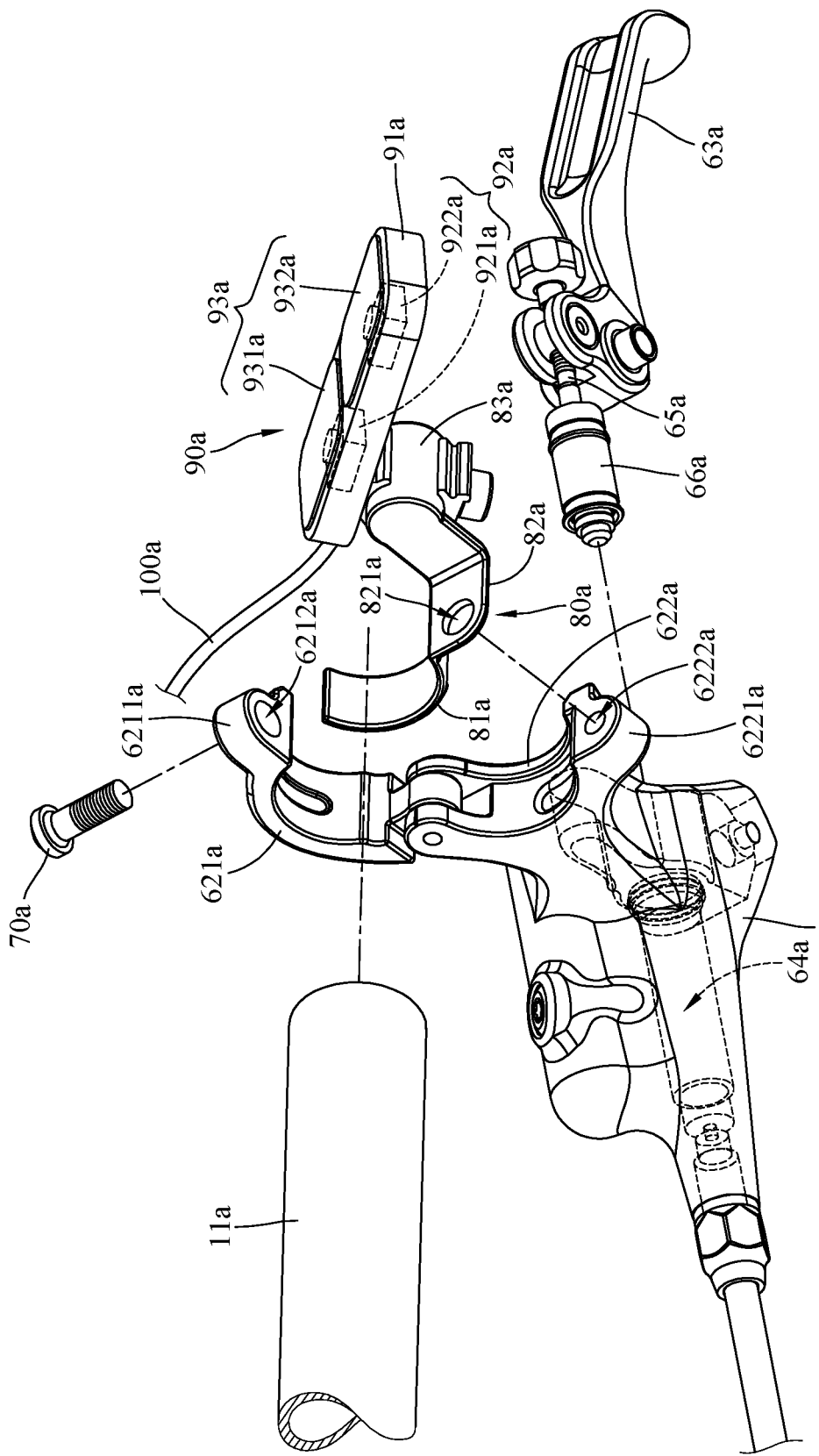
FIG. 5 is a partial exploded view of the handlebar, the brake assembly and the switch assembly of the bicycle head in FIG. 4.

Then, referring to FIGS. 4 and 5, where FIG. 4 is a perspective view of the handlebar 11a, a brake assembly 60a and a switch assembly 90a of the bicycle head 1a in FIG. 1, and FIG. 5 is a partial exploded view of the handlebar 11a, the brake assembly 60a and the switch assembly 90a of the bicycle head in FIG. 4.

The bicycle head 1a may further include the brake assembly 60a and a fastener 70a. The brake assembly 60a is, for example, a brake lever of a mountain bike. The brake assembly 60a includes a main body 61a, a lever clamp 62a, a lever part 63a, an oil pressure chamber 64a, a link 65a, and a piston 66a. The lever clamp 62a include a first clamping part 621a and a second clamping part 622a connected to each other, and the second clamping part 622a is connected to the main body 61a. The first clamping part 621a is fixed to the second clamping part 622a, and the first clamping part 621a and the second clamping part 622a together form a guide hole 67a therebetween. The handlebar 11a is disposed through the guide hole 67a and is clamped by the first clamping part 621a and the second clamping part 622a. In addition, the first clamping part 621a has a first protrusion 6211a having a first through hole 6212a, and the second clamping part 622a has a second protrusion 6221a having a the second through hole 6222a. The fastener 70a is disposed through one of the first through hole 6212a and the second through hole 6222a and is screwed with the other one of the first through hole 6212a and the second through hole 6222a so as to fix the first clamping part 621a and the second clamping part 622a to each other, such that the handlebar 11a can be held by the first clamping part 621a and the second clamping part 622a. The lever part 63a is pivotably disposed on the main body 61a, and the oil pressure chamber 64a is located in the main body 61a. Two opposite ends of the link 65a are respectively connected to the lever part 63a and the piston 66a, and a part of the link 65a and the piston 66a are movably located in the oil pressure chamber 64a.

In this embodiment, the bicycle head 1a may further include a mount piece 80a and the switch assembly 90a.

The mount piece 80a include a placement portion 81a, a fixing portion 82a, and an extension portion 83a. The placement portion 81a and the extension portion 83a are respectively connected to two adjacent sides of the fixing portion 82a. The placement portion 81a is located in the guide hole 67a and is located between the second clamping part 622a and the handlebar 11a. The fixing portion 82a is located between the first protrusion 6211a and the second protrusion 6221a. The fixing portion 82a has a third through hole 821a for the insertion of the fastener 70a. The extension portion 83a extends outward from the fixing portion 82a and is located outside the guide hole 67a and aside the first clamping part 621a of the lever clamp 62a.

The switch assembly 90a includes a housing 91a, a shift switch 92a, and a shift button 93a. The housing 91a is fixed on the extension portion 83a of the mount piece 80a, for example, via a screw. The shift switch 92a and the shift button 93a are disposed on the housing 91a. The shift switch 92a includes an upshift switch 921a and a downshift switch 922a. The upshift switch 921a and the downshift switch 922a are electrically connected to the first circuit board 22a. In detail, one of the terminals 41a of the electrical connector 40a is electrically connected to the shift switch 92a via an electric cable 100a, such that the upshift switch 921a and the downshift switch 922a are electrically connected to the first circuit board 22a. The shift button 93a includes an upshift button 931a and a downshift button 932a. The upshift button 931a and the downshift button 932a respectively correspond to the upshift switch 921a and the downshift switch 922a. Pressing the upshift button 931a is able to activate the upshift switch 921a to transmit an upshift signal to a bicycle derailleur via the electric cable 100a, the electrical connector 40a, the first circuit board 22a, and the antenna 23a. On the other hand, pressing the downshift button 932a is able to activate the downshift switch 922a to transmit a downshift signal to the bicycle derailleur via the same path.

Then, other exemplary bicycle heads of the disclosure will be illustrated hereafter, the following bicycle heads and the bicycle head in the previous embodiments are similar but yet have differences in some aspects, thus the following paragraphs merely illustrate the difference thereamong.

Figure 6:
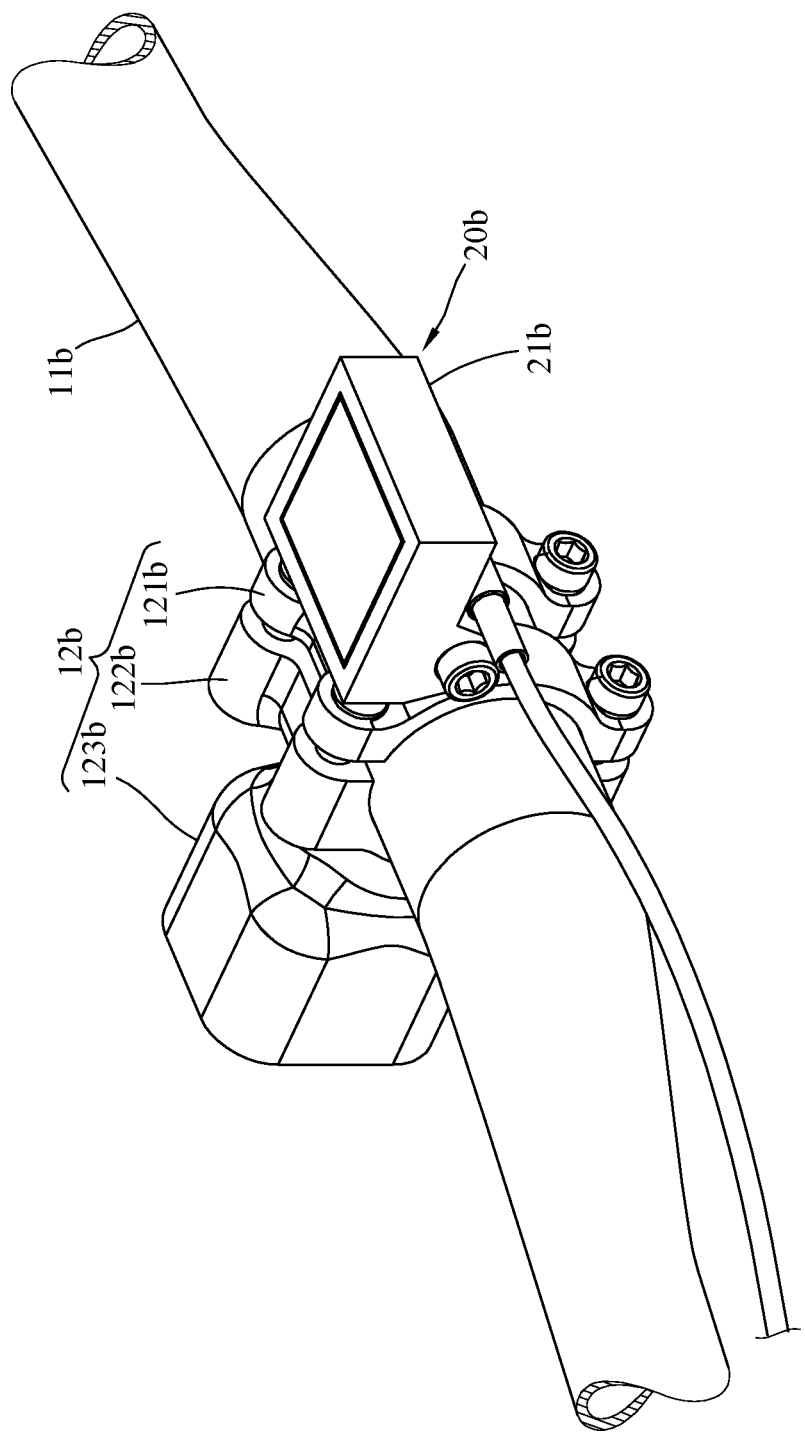
FIG. 6 is a perspective view of a head assembly and a control assembly of a bicycle head according to a second embodiment of the disclosure.
Figure 7:
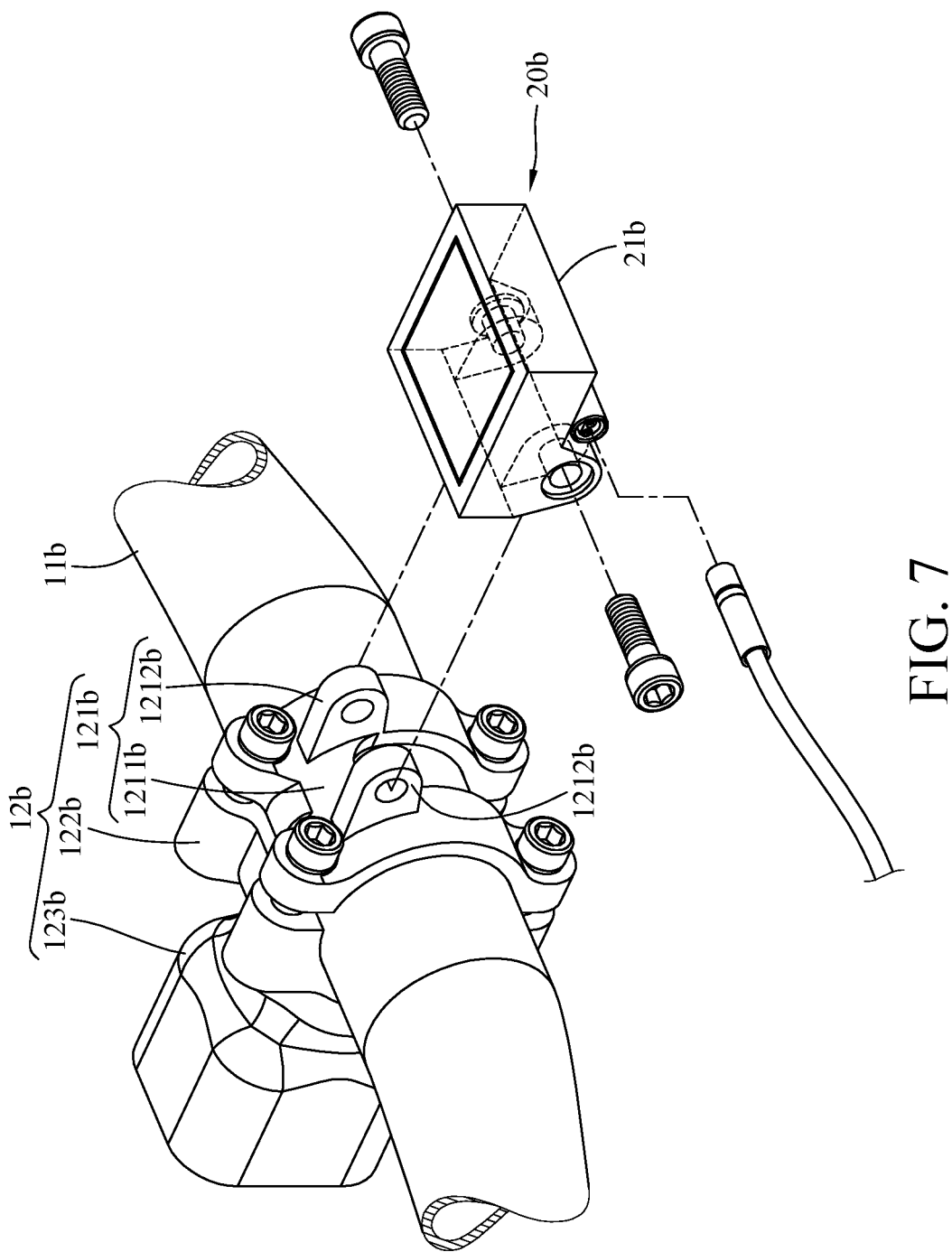
FIG. 7 is a partial exploded view of the head assembly and the control assembly of the bicycle head in FIG. 6.

Referring to FIGS. 6 and 7, where FIG. 6 is a perspective view of a head assembly and a control assembly 20b of a bicycle head according to a second embodiment of the disclosure, and FIG. 7 is a partial exploded view of the head assembly and the control assembly 20b of the bicycle head in FIG. 6.

In this embodiment, a stem 12b includes a first mount part 121b, a second mount part 122b, and an extension portion 123b, where the extension portion 123b is connected to the second mount part 122b. The first mount part 121b includes a clamping portion 1211b and two pivot portions 1212b protruding outward from the clamping portion 1211b. The clamping portion 1211b is fixed to the second mount part 122b, and the clamping portion 1211b and the second mount part 122b together clamp a handlebar 11b. Two opposite sides of a casing 21b of the control assembly 20b are pivotably and respectively disposed on the two pivot portions 1212b.

Figure 8:
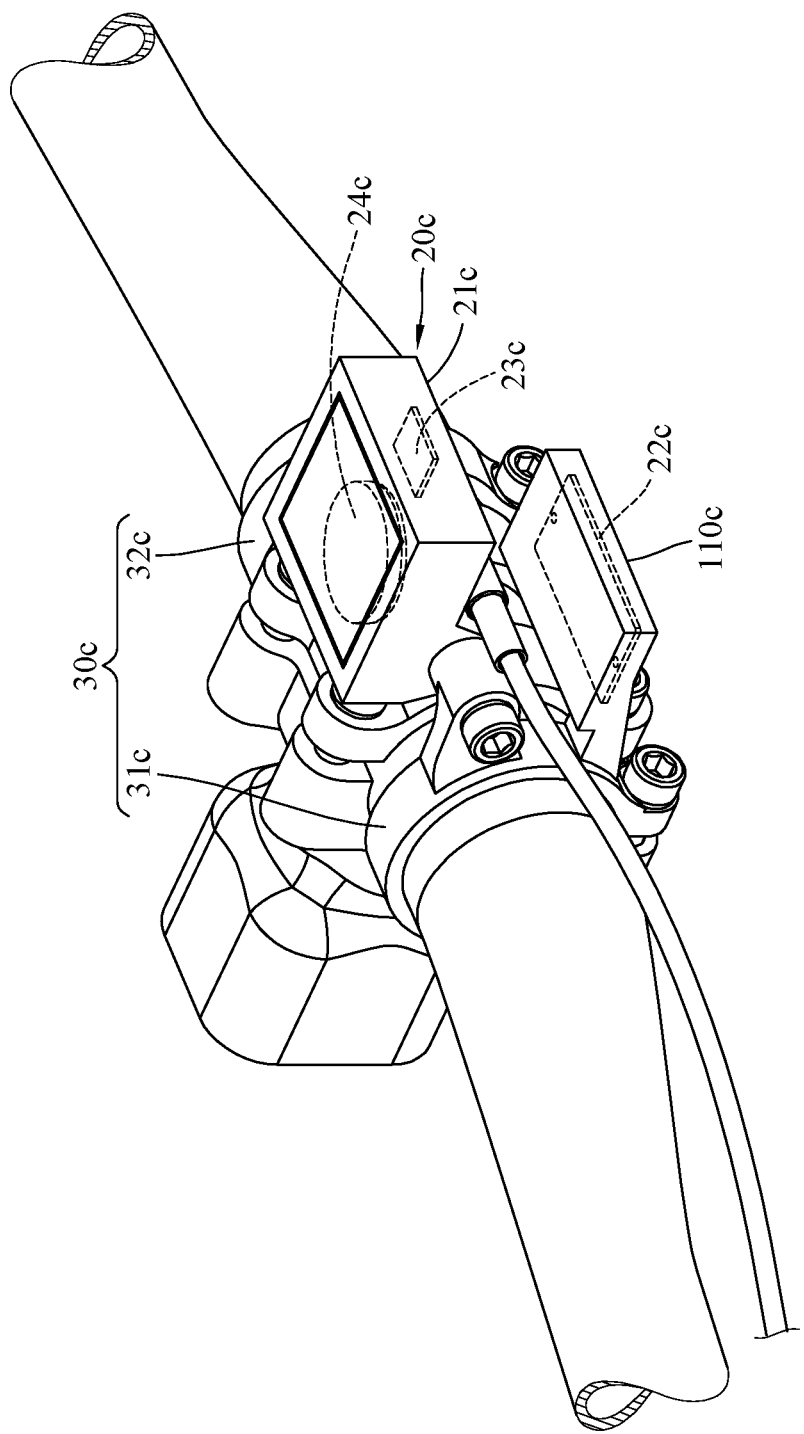
FIG. 8 is a perspective view of a head assembly and a control assembly of a bicycle head according to a third embodiment of the disclosure.

Then, referring to FIG. 8, where FIG. 8 is a perspective view of a head assembly and a control assembly 20c of a bicycle head according to a third embodiment of the disclosure.

In this embodiment, an antenna 23c and a battery 24c of the control assembly 20c is disposed in a casing 21c of the control assembly 20c, and a first circuit board 22c of the control assembly 20c is disposed on a clamp assembly 30c. In detail, the bicycle head may further include a casing 110c fixed to a first clamp 31c of the clamp assembly 30c, and the first circuit board 22c is disposed in the casing 110c so as to be disposed on the first clamp 31c of the clamp assembly 30c.

Note that the position of the first circuit board 22c is not restricted; in some other embodiments, the first circuit board 22c may be disposed on the second clamp 32c, or may be disposed on the clamping portion 1211b of the first mount part 121b shown in FIG. 7.

Figure 9:
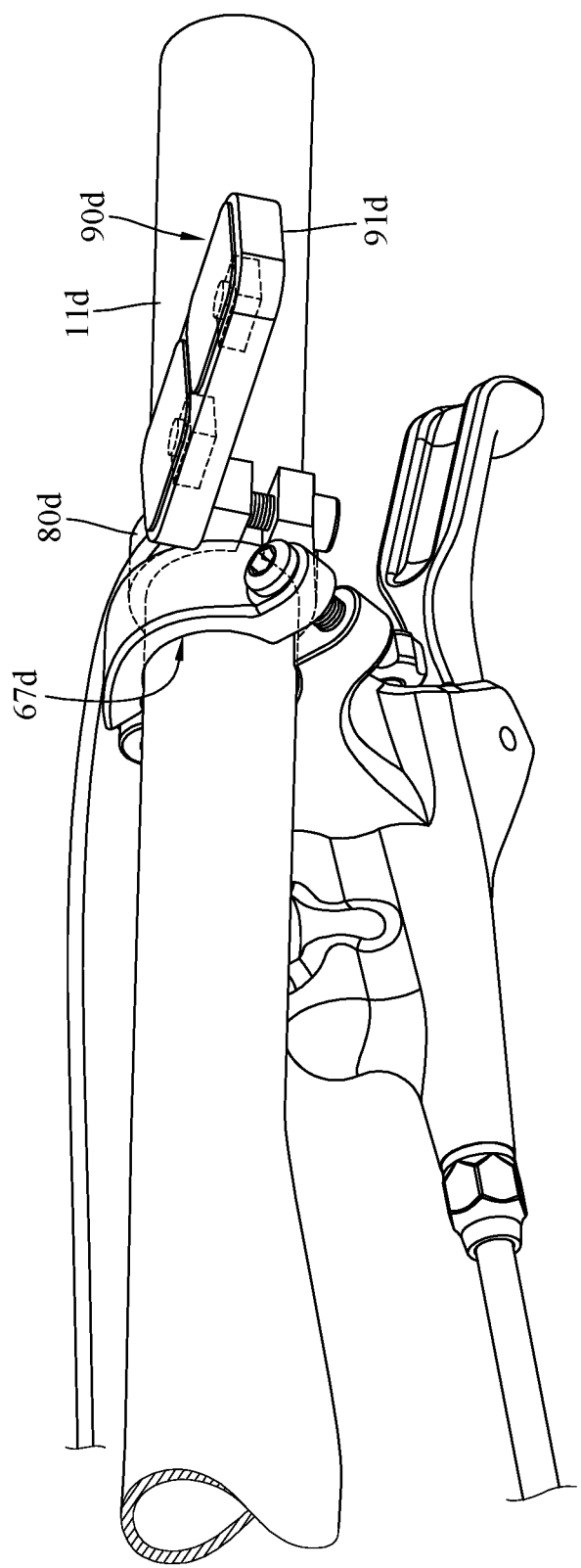
FIG. 9 is a perspective view of a handlebar, a brake assembly and a switch assembly of a bicycle head according to a fourth embodiment of the disclosure.

Then, referring to FIG. 9, where FIG. 9 is a perspective view of a handlebar 11d, a brake assembly and a switch assembly 90d of a bicycle head according to a fourth embodiment of the disclosure.

In this embodiment, a mount piece 80d is, for example, a clamp that can clamp and hold the handlebar 11d, the entire mount piece 80d is located outside a guide hole 67d formed by the first clamping part and the second clamping part (e.g., the first clamping part 621a and the second clamping part 622a), and a housing 91d of the switch assembly 90d is mounted on the handlebar 11d by being fixed on the mount piece 80d.

Figure 10:
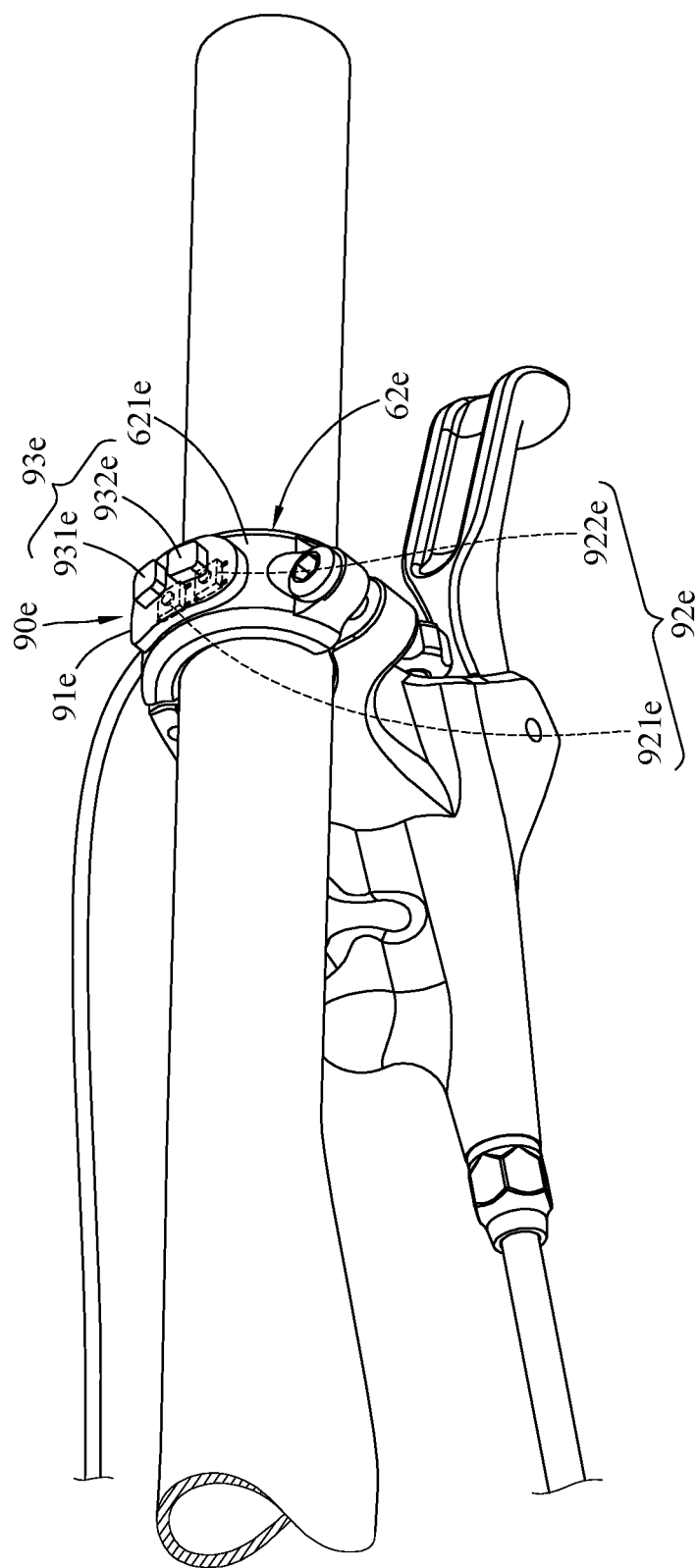
FIG. 10 is a perspective view of a handlebar, a brake assembly and a switch assembly of a bicycle head according to a fifth embodiment of the disclosure.
Figure 11:
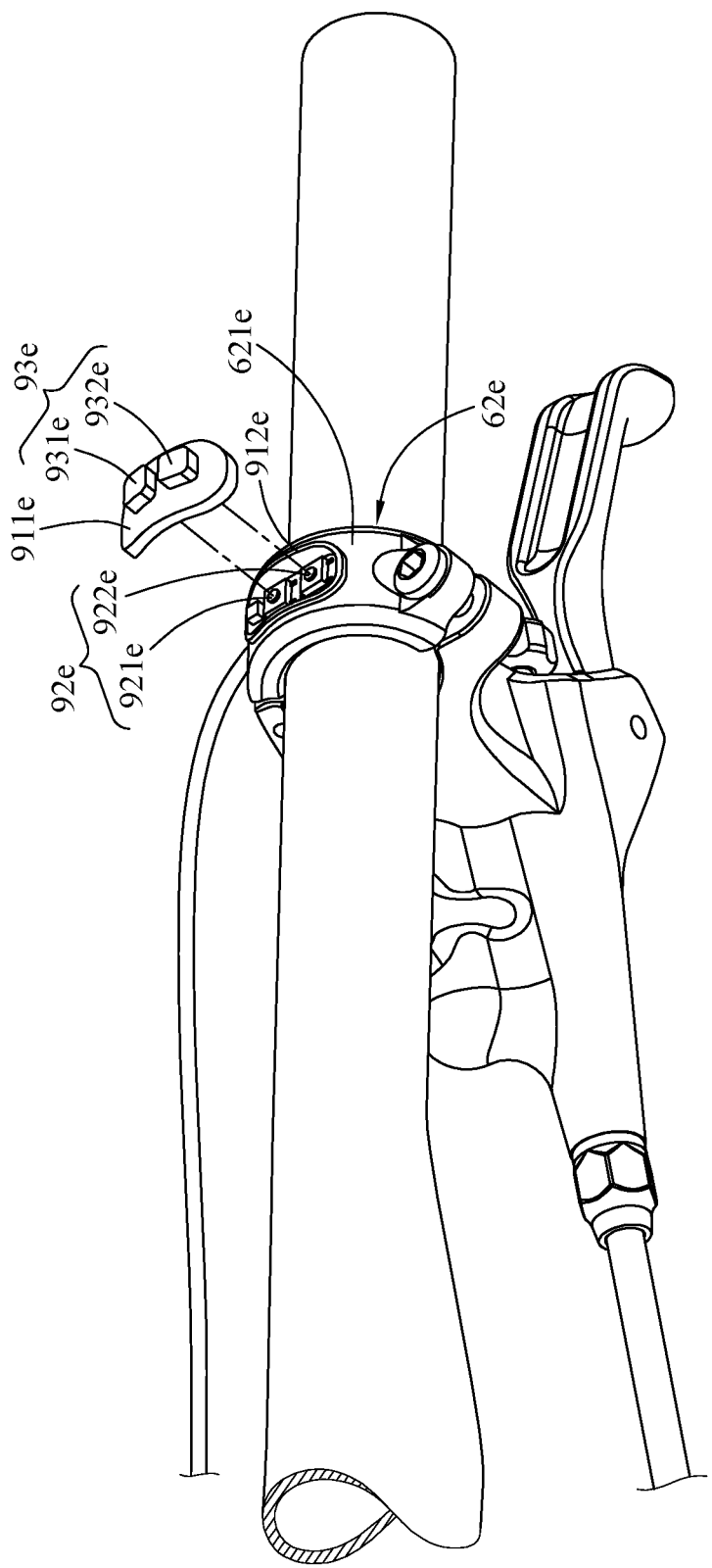
FIG. 11 is a partial exploded view of the handlebar, the brake assembly and the switch assembly of the bicycle head in FIG. 10.

Then, referring to FIGS. 10 and 11, where FIG. 10 is a perspective view of a handlebar, a brake assembly and a switch assembly 90e of a bicycle head according to a fifth embodiment of the disclosure, and FIG. 11 is a partial exploded view of the handlebar, the brake assembly and the switch assembly 90e of the bicycle head in FIG. 10.

In this embodiment, a shift switch 92e and a shift button 93e of the switch assembly 90e are disposed on a first clamping part 621e of a lever clamp 62e of the brake assembly. In detail, a housing 91e of the switch assembly 90e includes a cover part 911e and an accommodation part 912e, where the cover part 911e is detachably assembled with the accommodation part 912e, and the accommodation part 912e is fixed on the first clamping part 621e of the lever clamp 62e. An upshift switch 921e and a downshift switch 922e of the shift switch 92e is disposed in the accommodation part 912e, and an upshift button 931e and a downshift button 932e of the shift button 93e are disposed on the cover part 911e.

Figure 12:
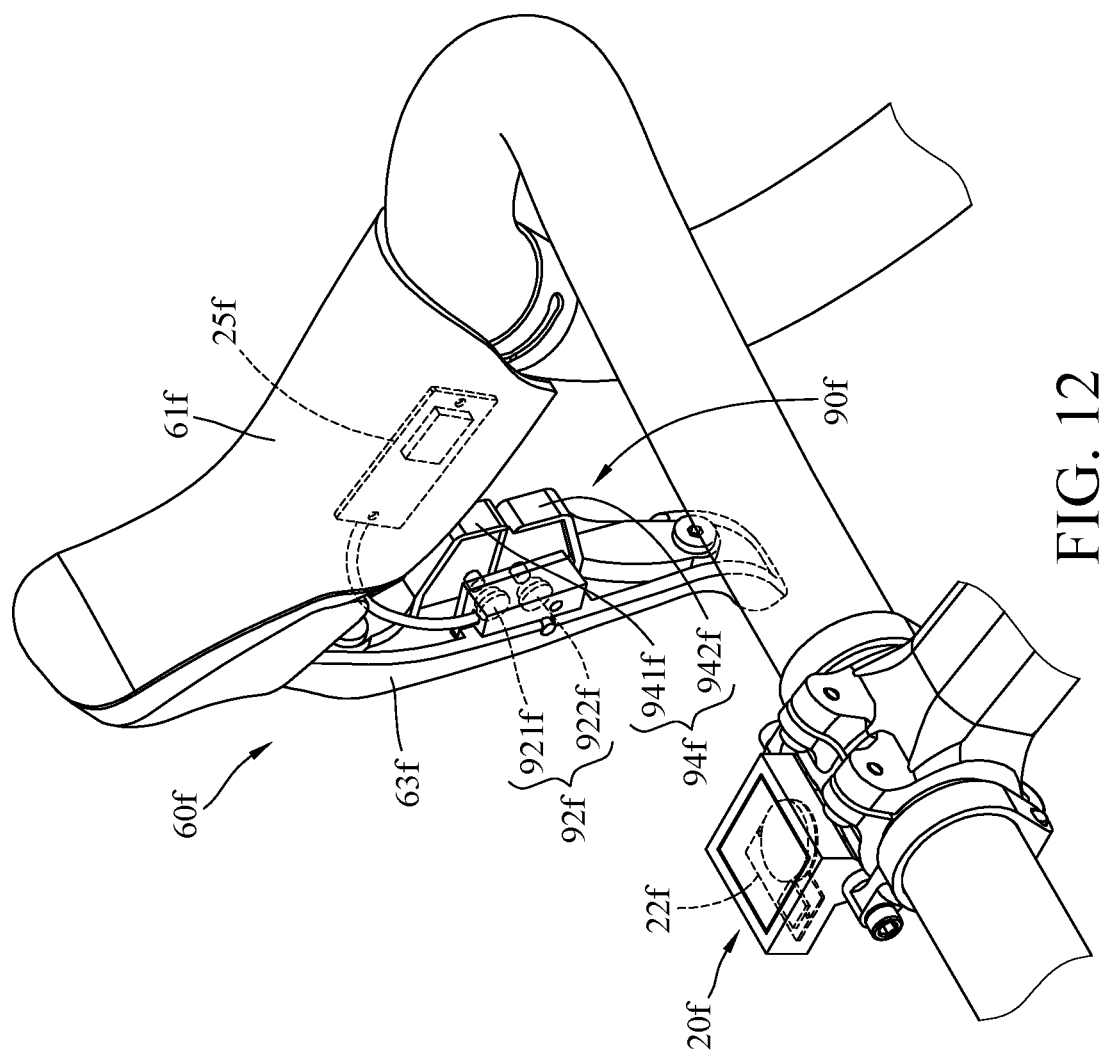
FIG. 12 a perspective view of a bicycle head according to a sixth embodiment of the disclosure.

Then, referring to FIG. 12, where FIG. 12 a perspective view of a bicycle head according to a sixth embodiment of the disclosure.

In this embodiment, a brake assembly 60f can be applied to a road bike. A switch assembly 90f further includes a shifter 94f. The shifter 94f includes an upshifter 941f and a downshifter 942f. The upshifter 941f and the downshifter 942f are pivotably disposed on a lever part 63f of the brake assembly 60f. A shift switch 92f of the switch assembly 90f is fixed on the lever part 63f, and an upshift switch 921f and a downshift switch 922f of the shift switch 92f respectively correspond to the upshifter 941f and the downshifter 942f.

In this embodiment, a control assembly 20f further includes a second circuit board 25f. The second circuit board 25f is disposed in a main body 61f of the brake assembly 60f and is electrically connected to a first circuit board 22f of the control assembly 20f, for example, via a wireless manner. The upshift switch 921f and the downshift switch 922f are electrically connected to the first circuit board 22f of the control assembly 20f via the second circuit board 25f.

In this embodiment, the connection between the second circuit board 25f and the first circuit board 22f is wireless, such that there will be no complex wired arrangement between the switches 921f and 922f and the first circuit board 22f.

Note that the second circuit board 25f is not restricted to be applied to a road bike or a mountain bike.

Figure 13:
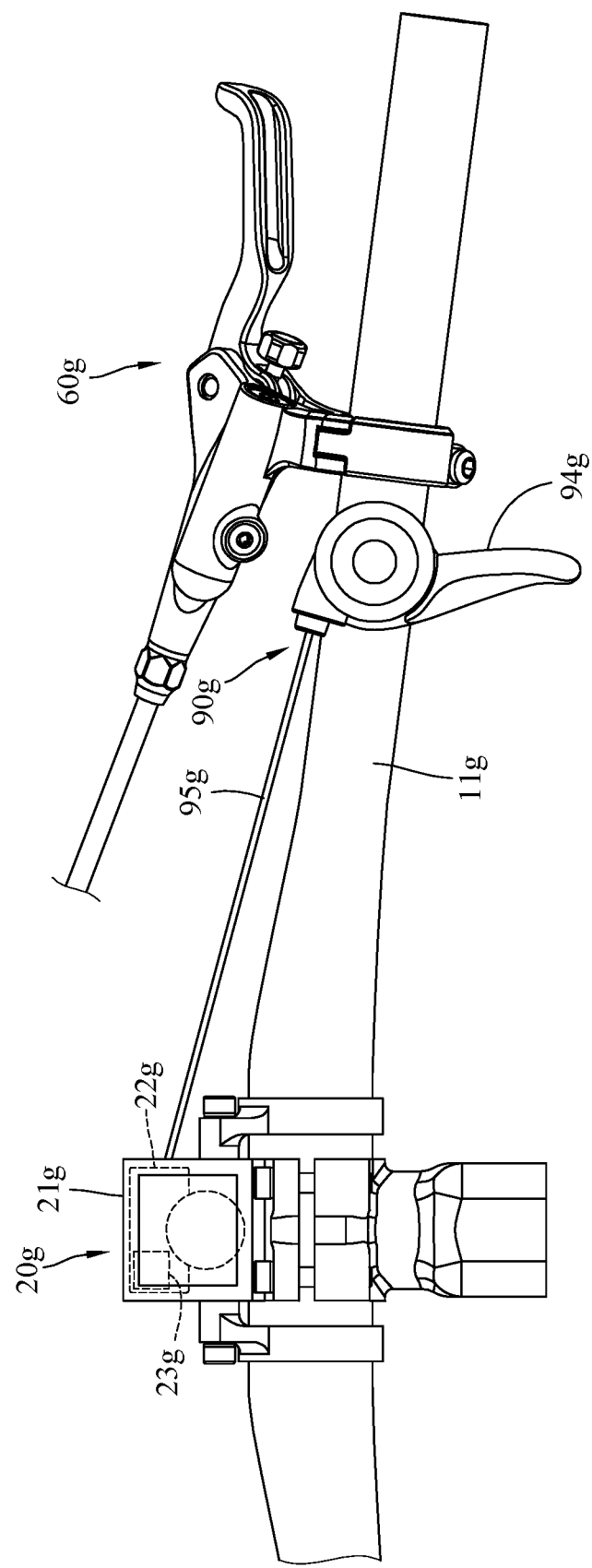
FIG. 13 a top view of a bicycle head according to a seventh embodiment of the disclosure.
Figure 14:
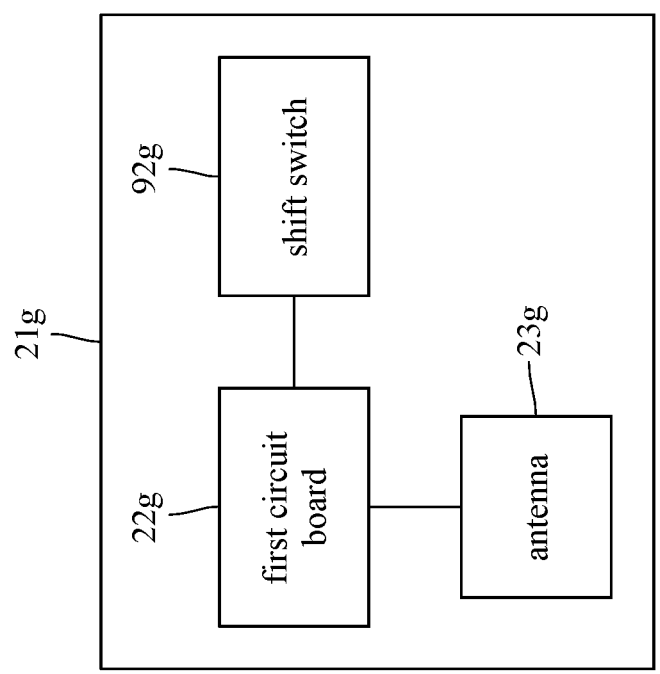
FIG. 14 is a block diagram of a control assembly and a shift switch of a switch assembly of the bicycle head in FIG. 13.

Then, referring to FIGS. 13 and 14, where FIG. 13 a top view of a bicycle head according to a seventh embodiment of the disclosure, and FIG. 14 is a block diagram of a control assembly 20g and a shift switch 92g of a switch assembly 90g of the bicycle head in FIG. 13.

In this embodiment, a brake assembly 60g can be applied to a mountain bike. The shift switch 92 of the switch assembly 90g is disposed on a casing 21g of the control assembly 20g. The switch assembly 90g further includes a shifter 94g and a cable 95g. The shifter 94g is disposed on a handlebar 11g, and two opposite ends of the cable 95g are respectively connected to the shifter 94g and the shift switch 92g. The shifter 94g is pivotable with respect to the handlebar 11g to activate the shift switch 92g via the cable 95g. Pivoting the shifter 94g is able to activate the shift switch 92g to transmit an upshift signal or a downshift signal to the bicycle derailleur via a first circuit board 22g and an antenna 23g of the control assembly 20g for upshifting or downshifting the bicycle derailleur.

Note that the brake assembly 60g is not restricted to be applied to the mountain bike or a road bike. In a case that the brake assembly is applied to the road bike, the shifter is disposed on the lever part of the brake assembly, and the shifter can be pivoted to activate the shift switch via the cable.

Figure 15:
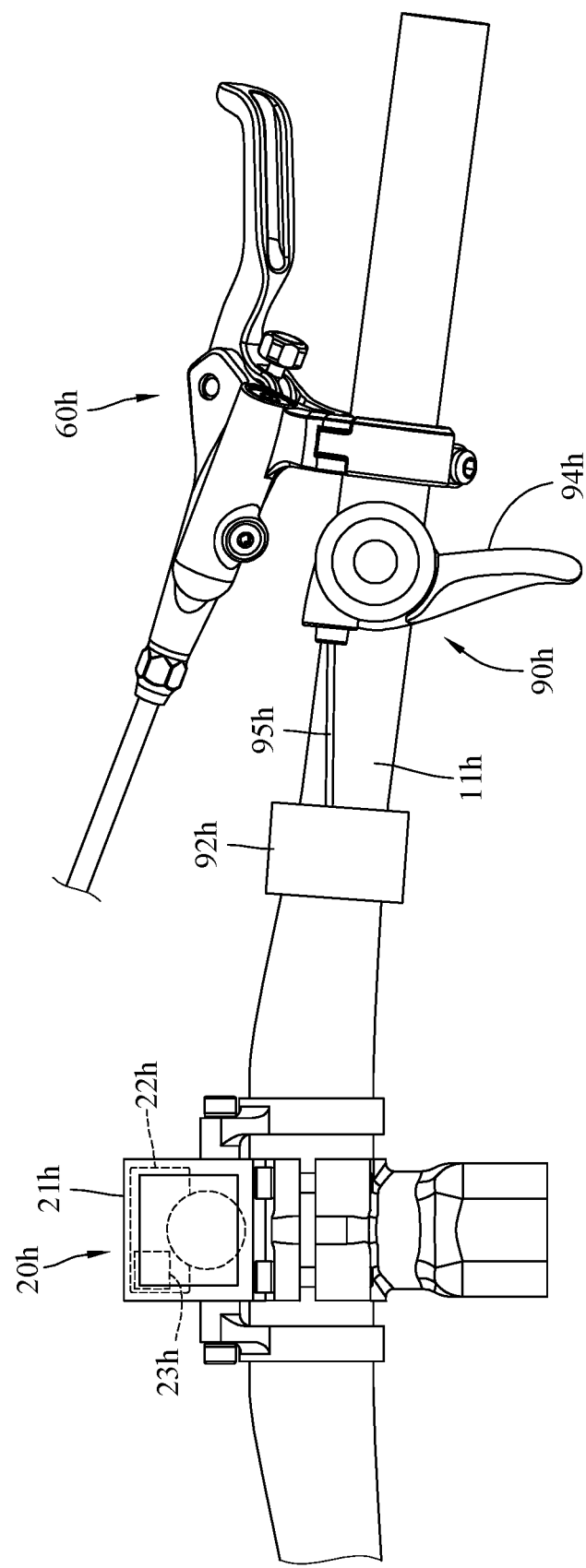
FIG. 15 is a top view of a bicycle head according to an eighth embodiment of the disclosure.
Figure 16:
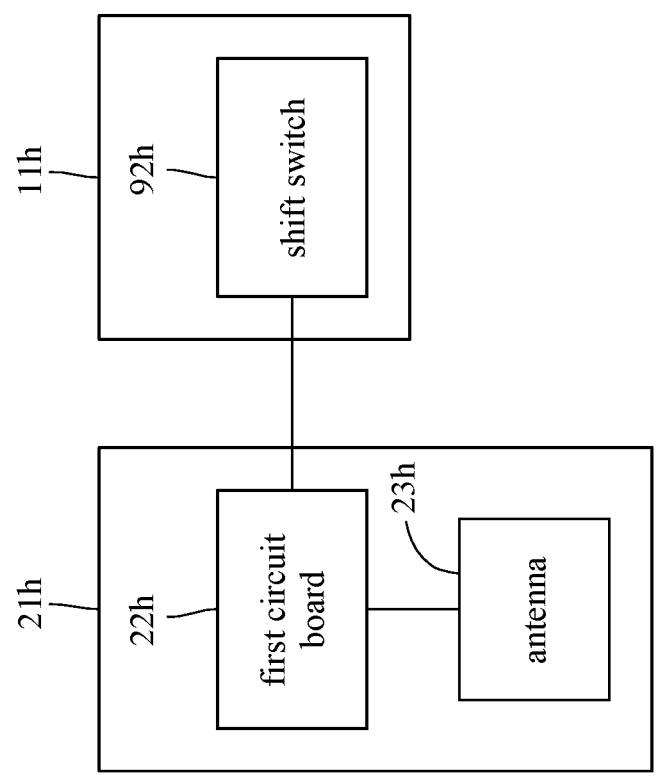
FIG. 16 is a block diagram of a control assembly and a shift switch of a switch assembly of the bicycle head in FIG. 15.

Then, referring to FIGS. 15 and 16, where FIG. 15 is a top view of a bicycle head according to an eighth embodiment of the disclosure, and FIG. 16 is a block diagram of a control assembly 20h and a shift switch 92h of a switch assembly 90h of the bicycle head in FIG. 15.

In this embodiment, a brake assembly 60h can be applied to a mountain bike. The shift switch 92h of the switch assembly 90h is disposed on a handlebar 11h. The switch assembly 90h further includes a shifter 94h and a cable 95h. The shifter 94h is disposed on the handlebar 11h, and two opposite ends of the cable 95h are respectively connected to the shifter 94h and the shift switch 92h. The shifter 94h is pivotable with respect to the handlebar 11h to activate the shift switch 92h via the cable 95h. Pivoting the shifter 94h is able to activate the shift switch 92h to transmit an upshift signal or a downshift signal to the bicycle derailleur via a first circuit board 22h and an antenna 23h of the control assembly 20h for upshifting or downshifting the bicycle derailleur.

Note that the brake assembly 60h is not restricted to be applied to the mountain bike or a road bike. In a case that the brake assembly is applied to the road bike, the shifter is disposed on the lever part of the brake assembly, and the shifter can be pivoted to activate the shift switch via the cable.

Figure 17:
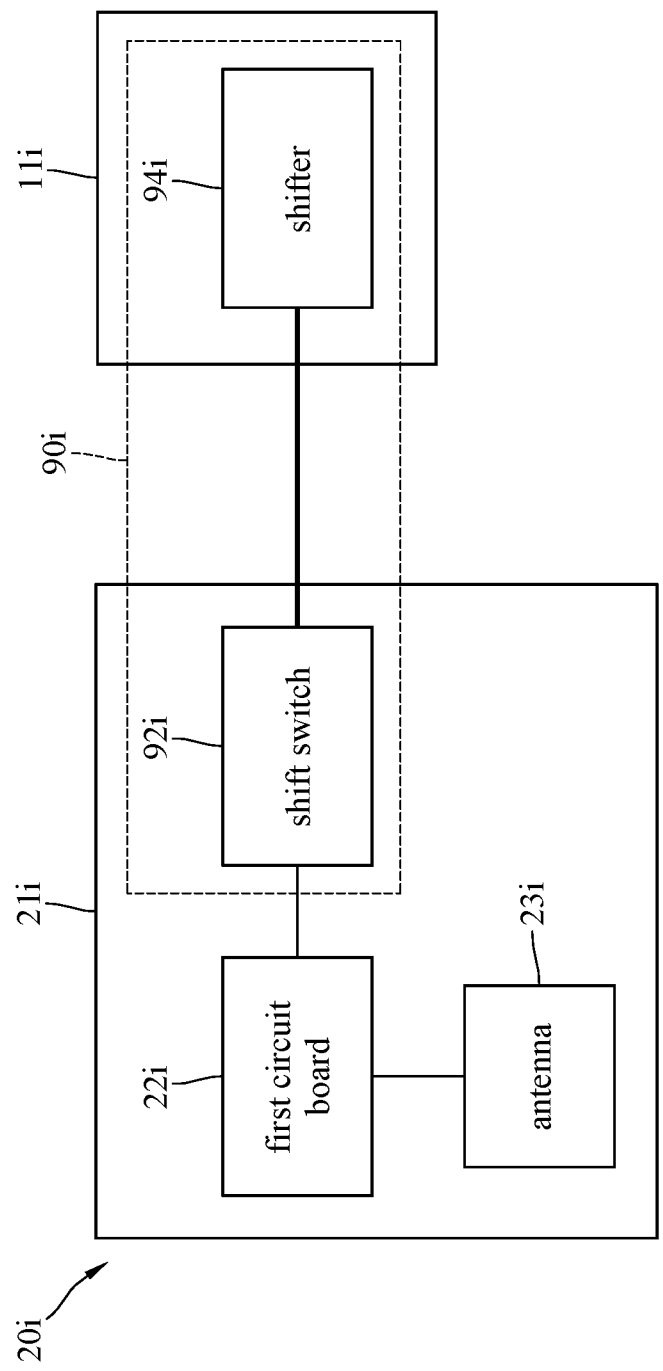
FIG. 17 is a block diagram of a control assembly and a switch assembly of a bicycle head according to a ninth embodiment of the disclosure.

Then, referring to FIG. 17, FIG. 17 is a block diagram of a control assembly 20i and a switch assembly 90i of a bicycle head according to a ninth embodiment of the disclosure, where a thin line between two blocks represents that two components are connected to each other via an electrical circuit, and a bold line between two blocks represents that the two components are connected to each other via an oil circuit.

In this embodiment, a brake assembly can be applied to a mountain bike. A shift switch 92*i* of the switch assembly 90*i* is disposed on a casing 21*i* of the control assembly 20*i*. The switch assembly 90*i* further includes a shifter 94*i* similar to the shifter 94*h* shown in FIG. 15. The shifter 94*i* is disposed on a handlebar 11*i*. The shifter 94*i* and the shift switch 92*i* are connected to each other via an oil circuit, thus the shifter 94*i* is pivotable with respect to the handlebar 11*i* to activate the shift switch 92*i* via an oil pressure. Pivoting the shifter 94*i* is able to activate the shift switch 92*i* to transmit an upshift signal or a downshift signal to the bicycle derailleur via a first circuit board 22*i* and an antenna 23*i* of the control assembly 20*i* for upshifting or downshifting the bicycle derailleur.

Note that the brake assembly is not restricted to be applied to the mountain bike or a road bike. In a case that the brake assembly is applied to the road bike, the shifter is disposed on the lever part of the brake assembly, and the shifter can be pivoted to activate the shift switch via an oil circuit.

Figure 18:
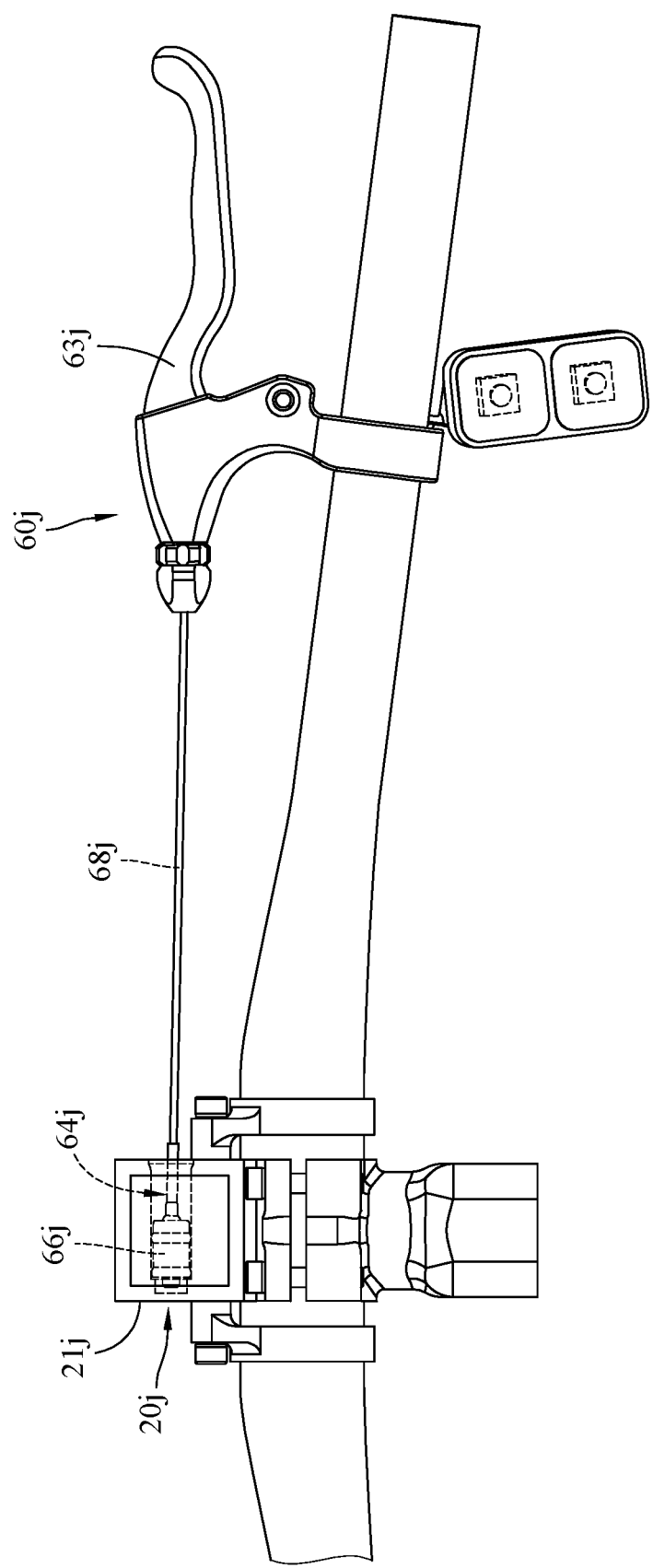
FIG. 18 is a top view of a bicycle head according to a tenth embodiment of the disclosure.

Then, referring to FIG. 18, FIG. 18 is a top view of a bicycle head according to a tenth embodiment of the disclosure.

In this embodiment, a brake assembly 60*j* further includes a cable 68*j*, and an oil pressure chamber 64*i* of the brake assembly 60*j* is located in a casing 21*j* of a control assembly 20*j*. A part of the cable 68*j* and the piston 66*j* is movably located in the oil pressure chamber 64*j*, and two opposite ends of the cable 68*j* are respectively connected to a lever part 63*j* and a piston 66*j* of the brake assembly 60*j*. Squeezing the lever part 63*j* is able to move the piston 66*j* in the oil pressure chamber 64*j* via the cable 68*j* for producing an oil pressure to brake the bicycle.

According to the bicycle heads as discussed above, the casing for accommodating at least one of the first circuit board, the antenna, and the battery can be disposed at a place where the handlebar is mounted on the stem, such that the first circuit board, the antenna, and the battery can be arranged in a way having less effect on the appearance of the bicycle.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle head, comprising:
 a head assembly, comprising a handlebar and a stem, wherein the handlebar is mounted on the stem; and
 a control assembly, comprising a casing, a first circuit board, an antenna and a battery, wherein the casing is pivotably disposed at a portion where the handlebar is mounted on the stem, the first circuit board, the antenna and the battery are electrically connected to one and another, and at least one of the first circuit board, the antenna and the battery is located in the casing;
 wherein the stem comprises a first mount part, a second mount part and an extension portion, the extension portion is connected to the second mount part, the first mount part is fixed to the second mount part, the first mount part and the second mount part together clamp onto the handlebar, and the casing of the control assembly is pivotably disposed on the first mount part.

2. The bicycle head according to claim 1, wherein the first mount part comprises a clamping portion and two pivot portions protruding outward from the clamping portion, the clamping portion is fixed to the second mount part, the clamping portion and the second mount part together clamp onto the handlebar, and two opposite sides of the casing of the control assembly are respectively and pivotably disposed on the two pivot portions.

3. The bicycle head according to claim 1, further comprising a display, wherein the display is disposed on the casing of the control assembly.

4. The bicycle head according to claim 1, wherein the first circuit board, the antenna and the battery are located in the casing of the control assembly.

5. The bicycle head according to claim 4, wherein the control assembly further comprises an electrical connector, the electrical connector is disposed on the casing of the control assembly, and the electrical connector has at least one terminal, and the at least one terminal is electrically connected to the first circuit board.

6. A bicycle head, comprising:
 a head assembly, comprising a handlebar and a stem, wherein the handlebar is mounted on the stem;
 a control assembly, comprising a casing, a first circuit board, an antenna and a battery, wherein the casing is disposed at a portion where the handlebar is mounted on the stem, the first circuit board, the antenna and the battery are electrically connected to one and another, and at least one of the first circuit board, the antenna and the battery are located in the casing;
 a brake assembly, comprising a main body, a lever clamp and a lever part, wherein the lever clamp is connected to the main body and clamps onto the handlebar, and the lever part is pivotably disposed on the main body; and
 a switch assembly, comprising a shift switch, the shift switch is disposed on the casing of the control assembly, the handlebar, the lever part or the lever clamp, and the shift switch is electrically connected to the first circuit board;
 wherein the switch assembly further comprises a shift button, the shift button and the shift switch are disposed at a portion where the lever clamp clamps onto the handlebar, and the shift button is configured to activate the shift switch.

7. The bicycle head according to claim 6, wherein the lever clamp comprises a first clamping part and a second clamping part connected to each other, the first clamping part is fixed to the second clamping part, the first clamping part and the second clamping part together form a guide hole therebetween, the handlebar is disposed through the guide hole and is clamped by the first clamping part and the second clamping part, and the shift switch and the shift button are disposed on the first clamping part.

8. The bicycle head according to claim 6, further comprising a mount piece, wherein the lever clamp comprises a first clamping part and a second clamping part connected to each other, the first clamping part is fixed to the second clamping part, the first clamping part and the second clamping part together form a guide hole therebetween, the handlebar is disposed through the guide hole and is clamped by the first clamping part and the second clamping part, the mount piece is fixed to the handlebar, at least part of the mount piece is located outside the guide hole, the switch assembly further comprises a housing, the shift switch and the shift button are disposed on the housing of the switch assembly, the housing of the switch assembly is fixed to the part of the mount piece which is located outside the guide hole.

9. The bicycle head according to claim 8, wherein the mount piece comprises a placement portion and an extension portion, the placement portion is located in the guide hole and is located between the second clamping part and the handlebar, the extension portion is located outside the guide hole and located aside the first clamping part, and the housing of the switch assembly is fixed on the extension portion.

10. The bicycle head according to claim 9, further comprising a fastener, wherein the first clamping part has a first protrusion having a first through hole, the second clamping part has a second protrusion having a second through hole, the mount piece further comprises a fixing portion, the placement portion and the extension portion are respectively connected to two adjacent sides of the fixing portion, the fixing portion is located between the first protrusion and the second protrusion and has a third through hole, the fastener is disposed through the third through hole and one of the first through hole and the second through hole and is screwed with the other one of the first through hole and the second through hole.

11. The bicycle head according to claim 8, wherein the mount piece is a clamp, the mount piece clamps onto the handlebar, the mount piece is entirely located outside the guide hole, and the housing of the switch assembly is fixed on the mount piece.

12. The bicycle head according to claim 6, wherein the brake assembly further comprises an oil pressure chamber, a cable and a piston, the oil pressure chamber is located in the casing of the control assembly, two opposite ends of the cable are respectively connected to the lever part and the piston, and a part of the cable and the piston are movably located in the oil pressure chamber.

13. A bicycle head, comprising:
a head assembly, comprising a handlebar and a stem, wherein the handlebar is mounted on the stem;
a control assembly, comprising a casing, a first circuit board, an antenna and a battery, wherein the casing is disposed at a portion where the handlebar is mounted on the stem, the first circuit board, the antenna and the battery are electrically connected to one and another, and at least one of the first circuit board, the antenna and the battery are located in the casing;
a brake assembly, comprising a main body, a lever clamp and a lever part, wherein the lever clamp is connected to the main body and clamps onto the handlebar, and the lever part is pivotably disposed on the main body; and
a switch assembly, comprising a shift switch, the shift switch is disposed on the casing of the control assembly, the handlebar, the lever part or the lever clamp, and the shift switch is electrically connected to the first circuit board;
wherein the switch assembly further comprises a cable and a shifter, the shift switch is disposed on the casing of the control assembly or the handlebar, the shifter is disposed on the handlebar or the lever part, two opposite ends of the cable are respectively connected to the shifter and the shift switch, the shifter is pivotable with respect to the handlebar or the lever part to activate the shift switch via the cable.

14. The bicycle head according to claim 13, wherein the brake assembly further comprise an oil pressure chamber, a link and a piston, the oil pressure chamber is located in the main body, two opposite ends of the link are respectively connected to the lever part and the piston, and a part of the link and the piston are movably located in the oil pressure chamber.

* * * * *